United States Patent [19]
Itoh

[11] Patent Number: 5,717,498
[45] Date of Patent: Feb. 10, 1998

[54] FACSIMILE MACHINE FOR RECEIVING, STORING, AND REPRODUCING ASSOCIATED IMAGE DATA AND VOICE DATA

[75] Inventor: Shingo Itoh, Komaki, Japan

[73] Assignee: Brother Kogyo Kabushiki Kaisha, Aichi-ken, Japan

[21] Appl. No.: 657,542

[22] Filed: Jun. 4, 1996

[30] Foreign Application Priority Data

Jun. 6, 1995 [JP] Japan ................. 7-139708

[51] Int. Cl.$^6$ .................. H04N 1/21; H04N 1/32
[52] U.S. Cl. .......... 358/434; 358/444; 358/468; 379/100
[58] Field of Search ................. 395/402, 403, 395/407, 404, 444, 434–436, 438–440, 443, 468; 379/100, 93

[56] References Cited

U.S. PATENT DOCUMENTS

| | | | |
|---|---|---|---|
| 4,922,524 | 5/1990 | Baba et al. | 379/100 |
| 5,237,430 | 8/1993 | Sakurai | 358/444 |

FOREIGN PATENT DOCUMENTS

| | | |
|---|---|---|
| A-1-286671 | 11/1989 | Japan. |
| A-4-180336 | 6/1992 | Japan. |

*Primary Examiner*—Scott A. Rogers
*Attorney, Agent, or Firm*—Oliff & Berridge, P.L.C.

[57] ABSTRACT

The received image data and voice data are both stored in the voice/image memory 40 of the control device 29. When both image data and voice data are received during a single reception operation, the voice/image matching table 33b is recorded with data of lead and end addresses of the area, where the image data is stored, in correspondence with data of an address of the area where the corresponding voice data is stored. After the voice data is reproduced at the speaker 47, the corresponding image data is outputted at the printer 11.

15 Claims, 7 Drawing Sheets

VOICE/IMAGE MATCHING TABLE

| VOICE MESSAGE ADDRESS | LEAD ADDRESS FOR IMAGE DATA | END ADDRESS FOR IMAGE DATA |
|---|---|---|
| 1 | a a a a a a a a | b b b b b b b b |
| 2 | 0 | 0 |
| 3 | c c c c c c c c | d d d d d d d d |
| 4 | e e e e e e e e | f f f f f f f f |
| 5 | 0 | 0 |
| 6 | g g g g g g g g | h h h h h h h h |
| . | . | . |
| . | . | . |
| . | . | . |
| . | . | . |

FACSIMILE MACHINE FOR RECEIVING, STORING, AND REPRODUCING ASSOCIATED IMAGE DATA AND VOICE DATA

BACKGROUND OF THE INVENTION

1. Field of the Invention

The present invention relates to a facsimile machine and more particularly to a reception data processing device employed in a facsimile machine with an answering machine function.

2. Description of the Related Art

There is conventionally known a facsimile machine provided with an answering machine function. A user of the facsimile machine sets the facsimile machine to an answering machine mode when he or she is away from the facsimile machine. When the facsimile machine receives an incoming facsimile message (image data) from a remote facsimile machine while the facsimile machine is in the answering machine mode, the facsimile machine stores the received image data as digital data. When the facsimile machine receives an incoming telephone message (voice data) from a remote telephone, the facsimile machine stores the received voice data also as digital data. When the user returns home, the user instructs the facsimile machine to reproduce the thus stored data. A printer, provided to the facsimile machine, prints out the image data onto a recording sheet. A speaker reproduces the voice data. This type of facsimile machine is described in Japanese Patent Application Kokai No. 1-286671.

SUMMARY OF THE INVENTION

Generally, the present facsimile machine receives either image data or voice data in any single reception operation. This is because remote facsimile machines can generally transmit only image data in any single transmission operation, and remote telephones can transmit only voice data. Some types of remote facsimile machines can, however, transmit both image data and voice data in a single transmission operation. The present facsimile machine, when in the answering machine mode, will store both the received image data and voice data. However, the image data and the voice data will be reproduced separately by the printer and the speaker. Accordingly, the user may not easily know that the image data and the voice data were transmitted together.

For example, a facsimile machine with a Call Reservation function can transmit a set of image data and a set of voice data in a single transmission operation. A caller calling from this type of facsimile machine can first send a set of image data to the present facsimile machine. Then, the caller can send a set of voice data (a telephone message) to the present facsimile machine before the telephone line is disconnected. The present facsimile machine can be constructed to store both the transmitted image data and the transmitted voice data.

It is assumed that while the present facsimile machines is in the answering machine mode, not only the above-described sets of image data and voice data but also several other image data and voice data are transmitted from various types of remote devices (telephones and facsimile machines.) The transmitted image data and voice data are all stored in the data storage device.

When the user returns home and instructs the present facsimile machine to reproduce the stored data, the printer prints out all the sets of image data in the order received. The speaker also reproduces all the sets of voice data in the order received. Because the printer and the speaker perform their reproduction operations independently, it is impossible for the user to know which image data was transmitted with which voice data. Especially when these plural sets of image data and voice data were received within a short period of time, it is very difficult to know correspondence between the reproduced image data and the reproduced voice data.

It is therefore, an object of the present invention to overcome the above-described drawbacks, and to provide an improved facsimile machine which can reproduce the received image data and the received voice data in a manner that a user can easily know the correspondence therebetween.

In order to attain the object and other objects, the present invention provides a facsimile machine capable of receiving both image data and voice data transmitted via a telephone line, the facsimile machine comprising: data reception means capable of performing a reception operation to receive at least one of voice data and image data transmitted via a telephone line, voice data representing voices and image data representing images; data storage means for storing the received at least one of voice data and image data, the data storage means storing the received voice data and image data in correspondence with each other when the voice data and the image data are both transmitted during a single reception operation; data output means for outputting the at least one of the voice data and the image data stored in the data storage means.

According to another aspect, the present invention provides a facsimile machine provided with an answering function, the facsimile machine comprising: data reception means for performing a reception operation to receive voice data and image data transmitted via a telephone line, voice data representing voices and image data representing images; data storage means for storing the voice data and the image data; storage control means for controlling, when voice data and image data are both transmitted during a single reception operation, the data storage means to store the voice data and image data in correspondence with each other; voice reproducing means for reproducing voices from the voice data stored in the data storage means; and image reproducing means for reproducing images from the image data stored in the data storage means.

According to a still another aspect, the present invention provides a data reception control device provided in a facsimile machine having an answering function, the device comprising: data reception means for performing a reception operation to receive voice data and image data transmitted via a telephone line, voice data representing voices and image data representing images; data storage means for storing the voice data and the image data; storage control means for controlling, when voice data and image data are both transmitted during a single reception operation, the data storage means to store the voice data and image data in correspondence with each other; voice reproducing means for reproducing voices from the voice data stored in the data storage means; and image reproducing means for reproducing images from the image data stored in the data storage means.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

A facsimile machine according to a preferred embodiment of the present invention will be described while referring to the accompanying drawings wherein like parts and components are designated by the same reference numerals to avoid duplicating description.

Figure 1:
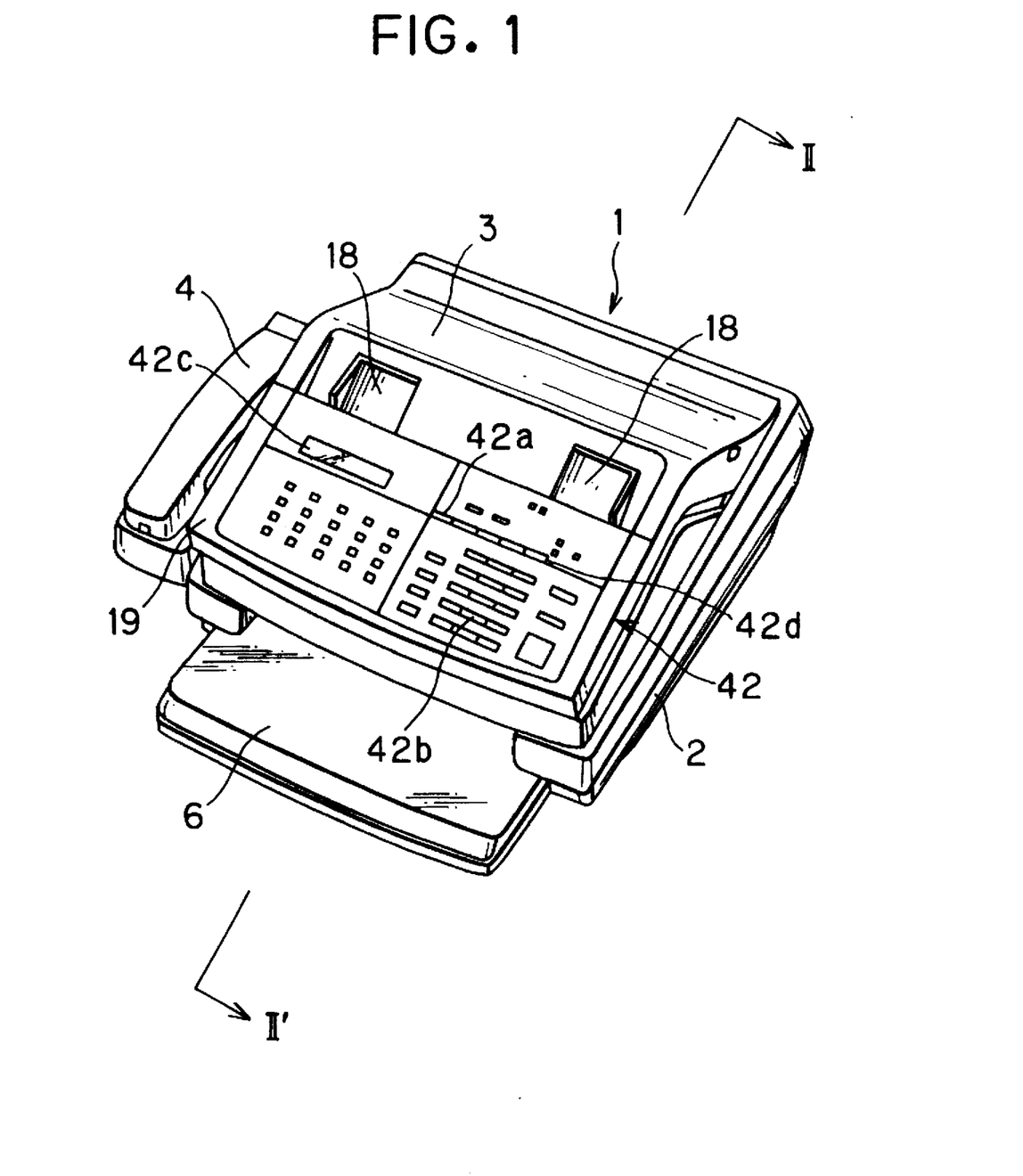
FIG. 1 is an external perspective view of a facsimile machine according to an embodiment of the present invention.
Figure 2:
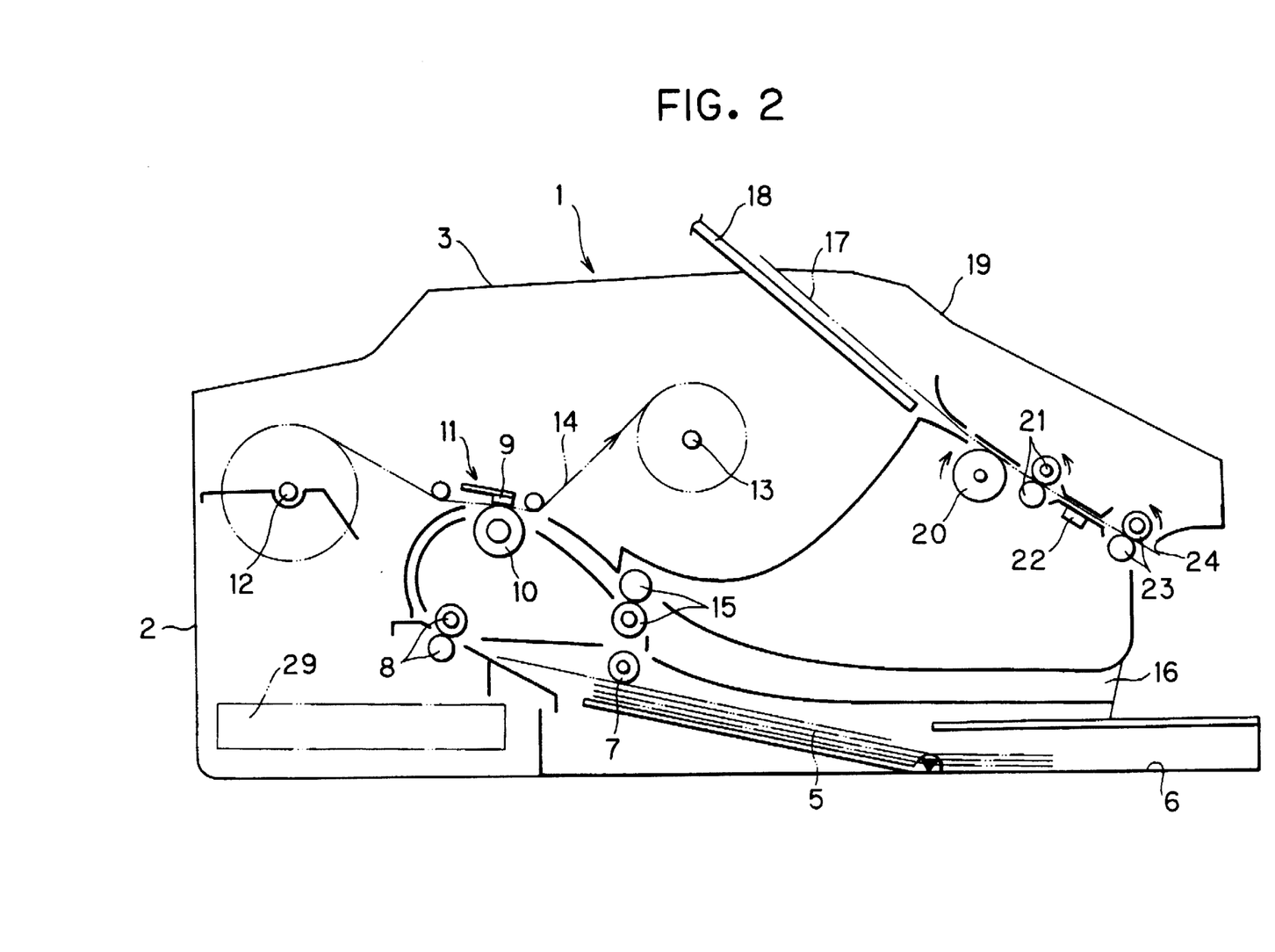
FIG. 2 is a sectional view of the facsimile machine of FIG. 1 taken along a line II–II'.

FIG. 1 is an external perspective view of the facsimile machine 1 of the present embodiment. FIG. 2 is a schematic sectional view of the facsimile machine 1. The facsimile machine 1 is provided with an answering machine function.

As shown in FIG. 1, the main body of the facsimile machine 1 is enclosed by an upper cover 3 and a lower cover 2. A handset 4 is provided at one side of the lower cover 2. A sheet cassette 6 is detachably mounted to the lower cover 2. As shown in FIG. 2, the sheet cassette 6 accommodates therein a stack of a plurality of record papers 5.

As shown in FIG. 2, a feed roller 7 is located above the sheet cassette 6. The feed roller 7 can pick up the record papers 5 one by one. A pair of conveyance rollers 8 are provided for conveying the picked up record paper 5. The pair of conveyance rollers 8 convey the record paper 5 toward a position in front of a printer 11. The printer 11 is constructed from a line type thermal head 9 and a platen roller 10. When the record paper 5 reaches the position in front of the printer 11, the pair of conveyance rollers 8 stop conveying the record paper 5 until image data is transmitted from remote callers.

An elongated web-shaped ink sheet 14 is wound around a supply reel 12. The ink sheet 14 is taken up by a take up reel 13 to pass between the line type thermal head 9 and platen roller 10. When image data is received from a remote caller, the record paper 5 and the ink sheet 14 are conveyed together at the same speed between the line type thermal head 9 and the platen roller 10. The thermal head 9 prints the received image data on the record paper 5 with ink from the ink sheet 14. Thus printed record paper 5 is conveyed by a pair of discharge rollers 15 and is discharged through an outlet 16 toward a tray (not shown in the drawing).

When a user of the present facsimile machine 1 desires to transmit image data of an original 17 to a remote facsimile machine, he or she places the original 17 on an original tray 18. As shown in FIG. 1, the original tray 18 is slanted downwardly toward a forward direction. A cover member 19 is provided to the upper cover 3. As shown in FIG. 2, the cover member 19 is provided above a separation roller 20, a pair of original conveyance rollers 21, a CCD scanner 22, and a pair of original discharge rollers 23 which are provided to the upper cover 3. The cover member 19 can be opened to expose those components 20–23. The separation roller 20 is capable of separating single sheets from several sheets of the original 17 set on the original tray 18. The pair of original conveyance rollers 21 are driven to convey the original sheet 17 toward the CCD scanner 22. The CCD scanner 22 reads out an original image from the original sheet 17 and produces image data for being transmitted to the remote facsimile machine. The pair of original discharge rollers 23 discharge the original sheet 17 out of the facsimile machine 1 through an original outlet 24. The original sheet 17 will be discharged onto an original tray (not shown in the drawings).

Figure 3:
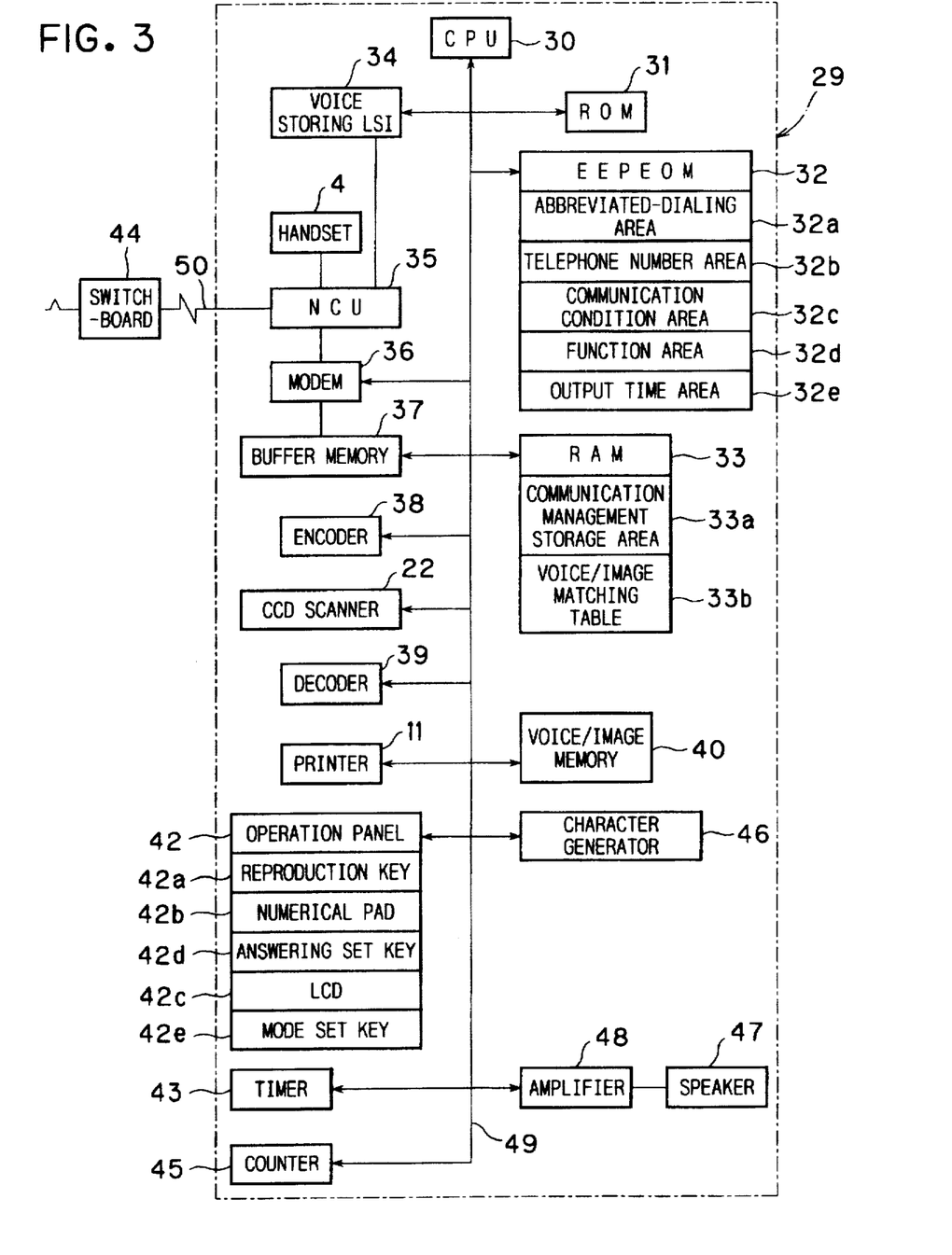
FIG. 3 is a block diagram showing a control device of the facsimile machine of FIG. 1.

FIG. 3 is a block diagram of a control device 29 provided to the facsimile machine 1. In the control device 29, a central processing unit (CPU) 30 is connected via a bus line 49 to: a ROM 31; a non-volatile EEPROM 32; a RAM 33; a voice storing integrated circuit (LSI) 34; a network control unit (NCU) 35; a modem 36; a buffer memory 37; an encoder 38; the CCD scanner 22; a decoder 39; and the printer 11 (i.e., the thermal head 9.) The CPU 30 is further connected via the bus line 49 to: a voice/image memory 40; an operation panel 42; a timer circuit 43; a counter 45; a character generator 46; and an amplifier 48.

The NCU 35 is for controlling a telephone circuit 50 connected to an external switchboard 44. Although not shown in the drawings, the NCU 35 includes a relay switch connected with the telephone circuit 50. When the CPU 30 controls the NCU 35 to close the relay switch, the telephone circuit 50 closes whereupon the present facsimile machine 1 is properly connected to the switchboard 44. Data (image data and voice data) can be transmitted between the present facsimile machine 1 and a remote communication machine (facsimile machine and telephone) via the telephone circuit 50 and the switchboard 44. When the CPU 30 controls the NCU 35 to open the relay switch, the telephone circuit 50 is opened whereupon the facsimile machine 1 is disconnected from the remote communication machine. The facsimile machine 1 can receive image data, voice data, or both during a single reception operation, i.e., after the telephone circuit 50 is closed and before the telephone circuit 50 is again opened.

A handset 4 is connected to the NCU 35. The handset 4 is for converting voice data transmitted from remote communication machines into actual voices and for converting actual voices of the user of the present facsimile machine 1 into voice data to be transmitted to remote communication machines.

The modem 36 is for modulating outgoing messages (image data and voice data) for being transmitted to remote communication machines (facsimile machines and telephones) and for demodulating incoming messages (image data and voice data) transmitted from remote communication machines. The encoder 38 is for encoding image data for being transmitted to remote communication machines. The buffer memory 37 is for temporarily storing the encoded image data. The decoder 38 is for decoding image data transmitted from remote communication machines.

The voice/image memory 40 is for storing various sets of image data and various sets of voice data which are transmitted from remote facsimile machines while the facsimile machine 1 is in an answering machine mode. The voice/image memory 40 stores the data as digital data.

Figure 4:
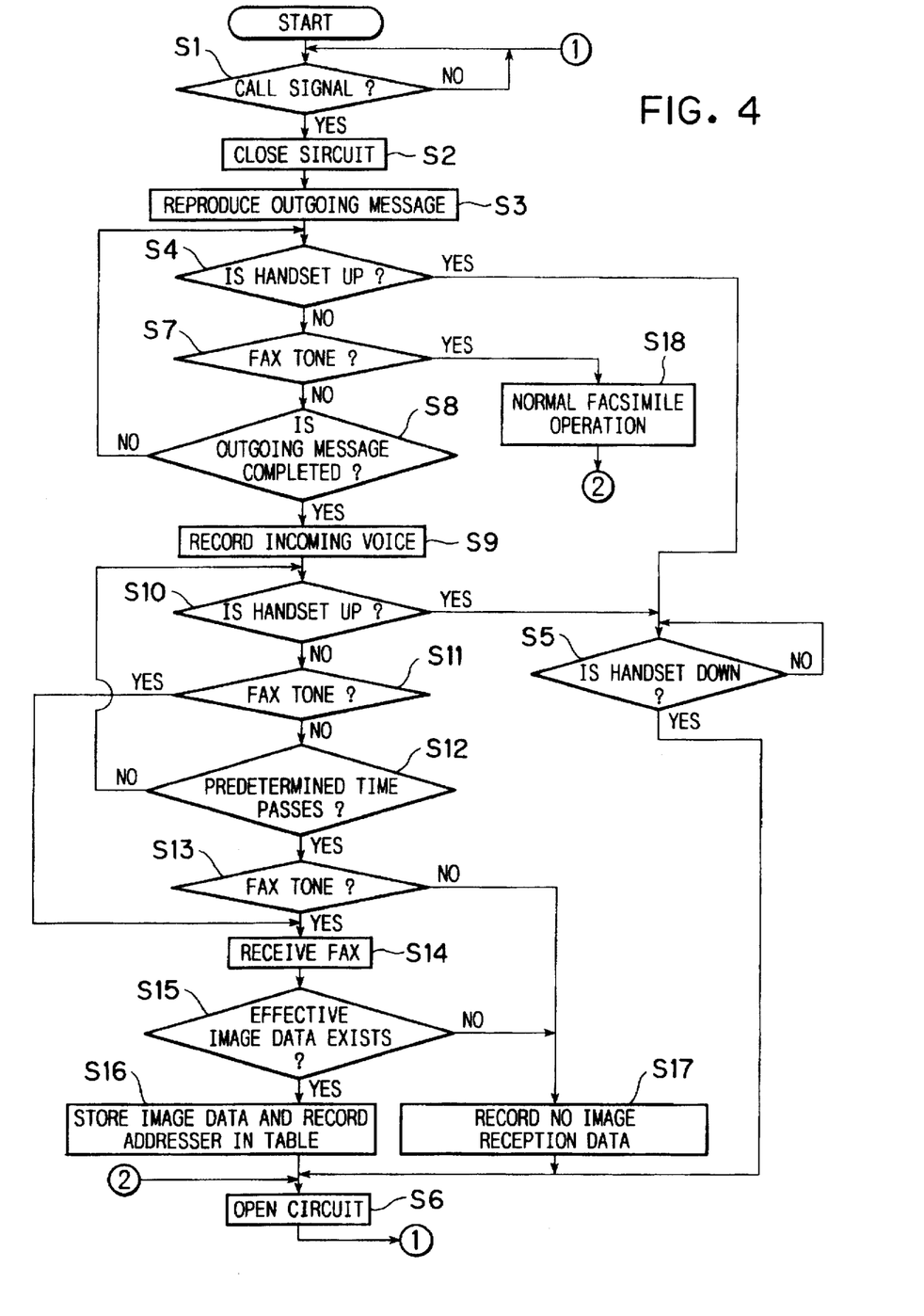
FIG. 4 is a flowchart showing a reception process according to an answering machine function performed by the facsimile machine of FIG. 1.
Figure 6:
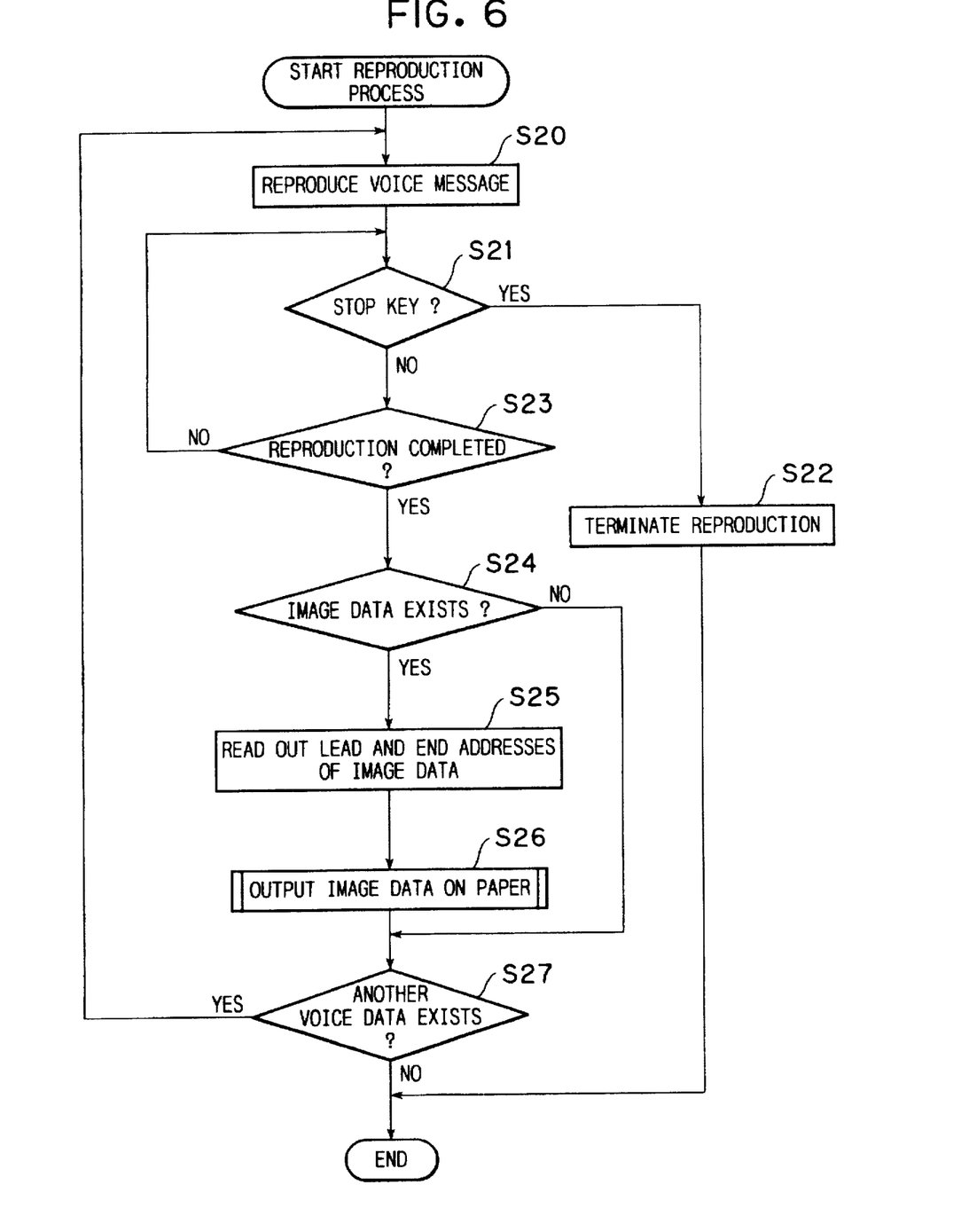
FIG. 6 is a flowchart showing a reproduction process performed by the facsimile machine of FIG. 1.

The ROM 31 stores therein various control programs including programs shown in FIGS. 4 and 6. The EEPROM 32 is formed with: an abbreviated-dialing storage area 32a, a receiver telephone number storage area 32b, a communication condition storage area 32c, a function storage area 3d, and an output time storage area 32e. The function storage area 32d is for storing various programs and data used for performing various functions such as various communication modes. The output time storage area 32e can be stored with data indicative of time when information stored in a communication management storage area 33a of the RAM 33 (to be described below) is desired to be outputted. The storage area 32e can also be stored with data indicative of time interval with which the information in the storage area 33a is desired to be outputted. Data can be written in and can be read out from the EEPROM 32.

The RAM 33 is formed with a communication management storage area 33a and a voice/image matching table 33b. The communication management storage area 33a is for storing information on communications performed by the present facsimile machine 1. For example, the communication management storage area 33a stores dates and times when the facsimile machine 1 has performed communications (transmissions and receptions).

Figure 5:
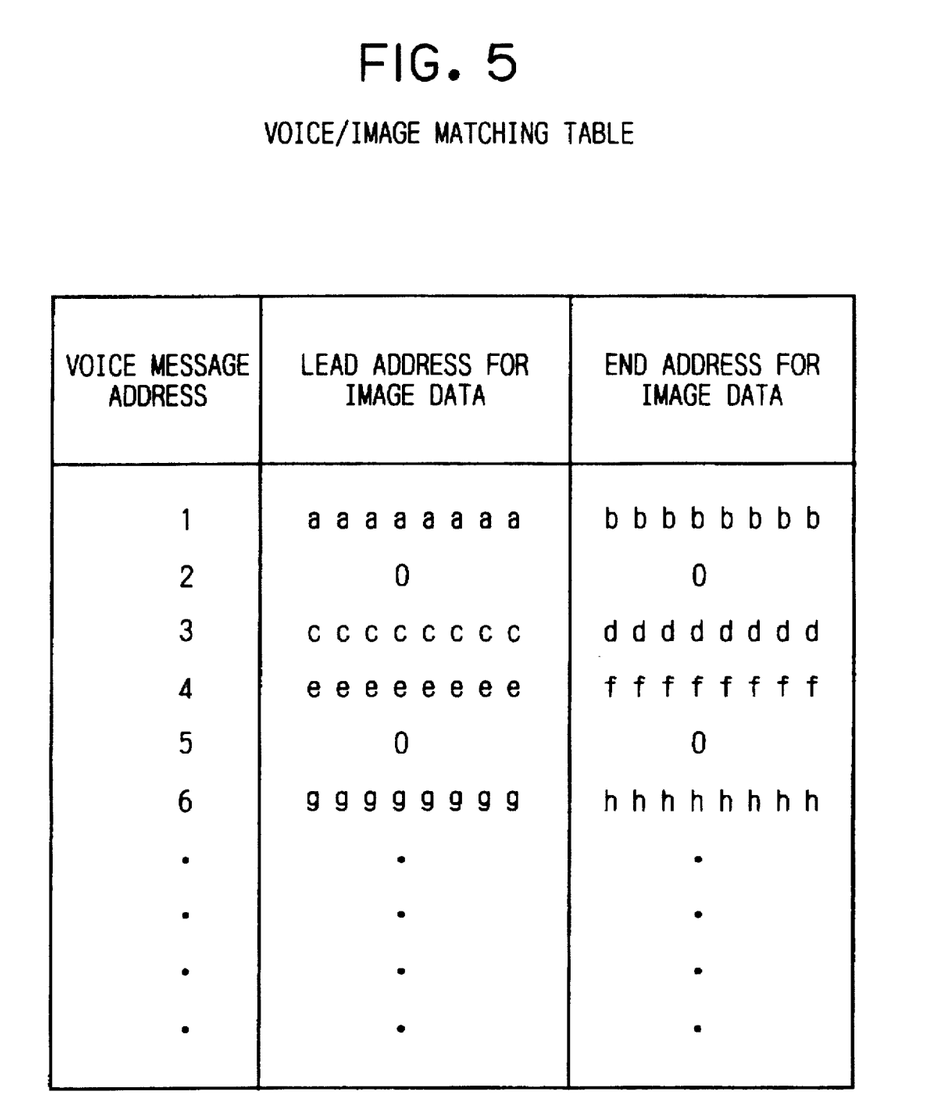
FIG. 5 illustrates a voice/image matching table stored in the facsimile machine of FIG. 1.

As shown in FIG. 5, the voice/image matching table 33b stores, as an index address, an address in the memory 40 where each set of voice data is stored. In correspondence with the index address, the table 33b stores start and end addresses in the memory 40 where a corresponding set of image data is stored. The RAM 33 stores other various data.

The voice storing integrated circuit 34 stores data of an answering message voice. The timer circuit 43 is provided with a calendar indicative of date and time. The timer circuit 43 outputs time information. The counter 45 is for counting the number of times the facsimile machine 1 has received incoming messages. The character generator 46 is for generating, in correspondence with plural character codes, characters to be displayed on a liquid crystal display 42c and to be printed by the printer 11. The amplifier 48 is for converting the digital voice data stored in the voice/image memory 40 into analog voice data and for amplifying the analog voice data. The speaker 47 connected to the amplifier 48 produces actual voice sounds based on the amplified voice data.

The operation panel 42 is formed with several keys such as a reproduction key 42a and a numerical pad 42b. The reproduction key 42a is for instructing reproduction of the voice data and the image data transmitted from remote callers and stored in the memory 40. The numerical pad 42b is used for inputting a telephone number of a remote communication machine with which the user desires to communicate. The operation panel 42 is further provided with the liquid crystal display 42c for displaying various characters.

The operation panel 42 is additionally provided with an answering machine function set key 42d and a reception mode set key 42e. The answering machine function set key 42d is for activating the answering machine function. The reception mode set key 42e is for setting the facsimile machine 1 to either one of a telephone reception mode, a facsimile reception mode, and a telephone/facsimile reception mode. When the facsimile machine 1 is set to the telephone reception mode, the facsimile machine 1 can receive only voice data from remote communication machines. When the facsimile machine 1 is set to the facsimile reception mode, the facsimile machine 1 can receive only image data. When the facsimile machine 1 is set to the telephone/facsimile reception mode, the facsimile machine 1 can receive both voice data and image data. It is noted that when the answering machine function is activated using the key 42d, the facsimile machine 1 is automatically set to the telephone/facsimile reception mode.

With the above-described structure, a user of the facsimile machine 1 can perform a telephonic communication with a remote telephone or facsimile machine via the handset 4. The facsimile machine 1 can therefore transmit voice data to and receive voice data from the remote device.

The present facsimile machine 1 can also perform a facsimile transmission operation in the following manner.

The facsimile machine 1 starts its facsimile transmission operation when a user sets an original 17 on the original tray 18, manipulates the numerical pad 42b to input a telephone number of a remote facsimile machine (receiver), and depresses a start key (not shown) provided to the operation panel 42. In this facsimile transmission operation, the CCD scanner 22 reads out an original image from the original 17, and produces image data. The image data is encoded by the encoder 38, and is temporarily stored in the buffer memory 37. The encoded image data is then modulated by the modem 36 and transmitted to the receiver via the NCU 35.

Every time the facsimile machine 1 completes the facsimile transmission process, the CPU 30 reads out the receiver's telephone number and name from the receiver telephone number storage area 32b. The telephone number is stored in the communication management storage area 33a together with time data outputted from the timer circuit 43. The time data indicates date and time when the facsimile machine 1 transmits image data. The storage area 33a is further recorded with data of the number of the transmitted papers and data indicative of a condition of transmission, that is, indicative of whether or not transmission error has happened during the transmission operation.

The present facsimile machine 1 can perform a normal facsimile reception operation for an incoming image data as described below.

According to the normal facsimile reception operation, when the facsimile machine 1 receives image data from a remote caller, the image data is demodulated by the modem 36, temporarily stored in the buffer memory 37, and decoded by the decoder 39. The decoded image data is printed on a record paper 5 by the printer 11. Every time the facsimile machine 1 completes the above-described facsimile reception process, the CPU 30 reads out the caller's telephone number and name from the received image data. The telephone number is stored in the communication management storage area 33a together with time data outputted from the timer circuit 43. The time data indicates date and time when the facsimile machine 1 receives the incoming data. The storage area 33a is further recorded with data of the number of the received papers and data indicative of a condition of the reception, that is, indicative of whether or not reception error has happened during the reception operation.

The present facsimile machine 1 can further perform answering machine function operation for an incoming message (incoming image data and incoming voice data) as described below.

FIG. 4 shows the answering machine function process performed by the present facsimile machine 1. This process starts when the user of the present facsimile machine 1 depresses the answering machine function set key 42d.

First, in S1, the program waits for reception of any call signal transmitted from a remote caller. Remote callers can include remote telephones, remote facsimile machines, and remote facsimile machines provided with a telephone function. When a call signal is received ("Yes" in S1), the telephone circuit 50 is closed in S2 so that the facsimile machine 1 is connected to the remote caller.

After a ringing sound is actuated a predetermined number of times, an answering message is retrieved in S3 from the voice storing integrated circuit 34. The message is, for example, "Hello. You have reached xxx-xxxx. I am not at home now. Please leave your name, telephone number, and message after the beep." It is noted that when the user has previously recorded his/her own answering message in a recording tape (not shown in the drawing,) this message is reproduced by a tape recorder (also not shown) in S3. The reproduced message is transmitted to the remote caller as an outgoing message.

When the user of the present facsimile machine 1 is present at the facsimile machine 1 and picks up the handset 4 after the answering message is reproduced ("Yes" in S4), the user can perform a telephonic conversation with the caller. In this case, voice data transmitted from the caller is not stored in the memory 40. Data of the user's voices is not stored either. When the handset 4 is replaced on the cradle ("Yes" in S5), the telephone circuit 50 is opened in S6. The program returns to S1 and the facsimile machine 1 waits for another call signal.

When the handset 4 is not picked up ("No" in S4), it is judged in S7 whether or not a FAX tone signal is received, because before the remote communication machine transmits image data, the remote communication machine transmits a FAX tone signal. When no FAX tone is received ("No" in S7), it is judged in S8 whether reproduction of the answering message is completed. When reproduction of the answering message is completed ("Yes" in S8), an answering machine process is executed in S9 to record a set of incoming voice data in the voice/image memory 40. In S9, the NCU 35 receives the set of voice data, and the modem 36 demodulates the set of voice data. The memory 40 stores therein the demodulated set of voice data as digital voice data in an empty area indicated by the of smallest address number. For example, when five sets of voice data have already been stored at addresses numbered 1 through 5 of the memory 40, the newly incoming data is stored at an address numbered 6. Thus, the received sets of voice data are stored in the memory 40 in the order received.

It is noted that each storage area defined by a single address number can store a certain amount of voice data transmitted from a remote caller during a predetermined period of time. For example, each storage area can store voice data transmitted within a predetermined time period from 30 seconds to one minute. Accordingly, every time an incoming voice message is received, the message is stored only during the predetermined time period.

Then, as shown in FIG. 5, the address number, at which the newly incoming voice data is stored, is recorded in the voice/image matching table 33b as an index address. The address numbers are recorded in the table 33b in the order of reception. In this example, the address number "6" is stored following the address number "5."

When the predetermined period of time elapses after the recording operation has started ("Yes" in S12), the recording operation is terminated.

It is noted that when the user of the facsimile machine 1 picks up the handset 4 before the predetermined time period is reached ("No" in S12 and "Yes" in S10), the operator can perform a telephonic communication with the caller. In this case, voice data which has been recorded in the memory 40 remains unchanged.

It is further noted that when the answering machine function is thus properly conducted in S9 and the incoming voice messages are stored in the memory 40, an answering display lamp (not shown in the drawing) provided to the operation panel 42 is turned on. The display lamp may start blinking. When the user returns home, the user can look at the display lamp to tell whether any voice messages have been recorded in the facsimile machine 1.

After transmitting the voice data, the remote caller may further transmit image data. It is therefore judged in S13 whether or not a FAX tone signal is received. When a FAX tone signal is detected during or after the incoming voice recording operation ("Yes" in S11 and in S13), image data which is transmitted following the FAX tone signal is received in S14. If the transmitted image data is properly received as a set of effective image data ("Yes" in S15), the set of effective image data is stored in S16 as digital data in the voice/image memory 40. This set of image data is stored in the memory 40 at a certain storage area. Also in S16, as shown in FIG. 5, data of the lead and end addresses of the area, where the set of image data is now stored, is recorded in the voice/image matching table 33b. The lead and end addresses are recorded in correspondence with the index address indicative of the area where the set of voice data is stored in S9.

In this example, after an incoming voice message is stored in S9 in the address "6" of the memory 40, an image message is received in S14. The image data is stored in an area in the memory 40 between a lead address indicated by "ggggggggg" and an end address indicated by "hhhhhhhh." The addresses "ggggggggg" and "hhhhhhhh" are therefore recorded in the voice/image matching table 33b in correspondence with the index address "6."

On the other hand, when the received image data fails to be properly received, and therefore no effective data is received ("No" in S15), data indicative of reception of no image data is recorded in S17 in the table 33b in correspondence with the index address of the voice data. In this example, data "0" indicates reception of no image data. In the example shown in FIG. 5, only voice data has come at the fifth reception, and therefore data "0" is stored in correspondence with the index address "5." Then, in S6, the telephone circuit 50 is opened.

After the voice data recording operation is completed ("Yes" in S12), if no FAX tone signals are received ("No" in S13), data indicative of reception of no image data is also stored in S17 in the table 33b in correspondence with the index address of the voice data.

When a FAX tone signal is initially detected in S7, only image data will be transmitted from the caller. No voice data will be transmitted from the caller. In this case, the facsimile machine 1 of the present embodiment does not perform its answering machine function, but performs a normal facsimile reception process in S18. That is, image data is received, demodulated by the modem 36, temporarily stored in the buffer memory 37, and decoded by the decoder 39. The decoded image data is printed on a record paper 5 by the printer 11. It is noted, however, that the received image data may be stored in the voice/image memory 40 when required. The image data may be read out of the memory 40 and printed out on a record paper 5 afterward.

Every time the facsimile machine 1 completes the data receiving process of S9, S14, or S18, the CPU 30 reads out the caller's telephone number and name from the received data. The telephone number is stored in the communication management storage area 33a together with time data outputted from the timer circuit 43. The time data indicates date and time when the facsimile machine 1 receives the incoming data. The storage area 33a is further recorded with data of the number of the received papers and data indicative of a condition of the reception, that is, indicative of whether or not reception error has happened during the reception operation.

It is noted that the communication management storage area 33a may be formed in the non-volatile EEPROM 32 in order to prevent the management information stored in this area from being erased when the facsimile machine 1 is powered off.

As described above, according to the answering machine operation, the received image data and voice data are both stored in the voice/image memory 40 of the control device 29. There are the cases where image data and voice data are both received in a single reception operation. That is, voice data is received in S9 after the telephone line is connected in S2, and then image data is received in S14 before the telephone line is again disconnected in S6. In this case, in the voice/image matching table 33b, data of lead and end addresses of the area where the image data is stored is recorded in correspondence with data of an address of the area, where the corresponding voice data is stored.

Next, a voice/image reproduction routine will be described with reference to FIG. 6.

When the user of the facsimile machine 1 returns home, he/she looks at the answering display lamp when it is blinking. The user depresses the reproduction key 42a, whereupon a voice/image reproduction process is started. In this process, first, a set of voice data is reproduced from the memory 40 in S20. In S20, a read pointer is first set at the smallest index address in the voice/image matching table 33b. Then, digital voice data is read from a storage area indicated by the set address in the voice/image memory 40. The digital voice data is converted into analog data and amplified by the amplifier 48, and reproduced by the speaker 47 as voice messages.

When the user depresses a stop key (not shown in the drawing) provided to the operation panel 42 ("Yes" in S21), reproduction operation is terminated in S22. On the other hand, when the user does not depress the stop key ("No" in S21), the voice data is entirely reproduced from the area of the set address. When reproduction is completed ("Yes" in S23), the voice/image matching table 33b is searched, and it is judged in S24 whether or not any image data is stored in correspondence with the set address number. In other words, it is judged whether or not lead and end addresses are stored in correspondence with the set address number. If lead and end addresses are stored ("Yes" in S24), these addresses are read out from the table 33b in S25. Then, in S26, image data stored between the lead and end addresses in the memory 40 is read out and recorded on a record paper 5.

Thus, even when the facsimile machine 1 has received a plurality of sets of image data and a plurality of sets of voice data, the user can easily grasp which sets of image data has been transmitted with which sets of voice data.

It is noted that the voice/image matching table 33b simply stores addresses in the memory 40 where voice data and corresponding image data are stored. It is easily and quickly possible to know whether image data is stored in correspondence with voice data through searching the table 33b in S24.

When output of one set of image data is completed in S26, it is judged in S27 whether another set of voice data is stored in the memory 40. This judgement is conducted through searching the table 33b. If another set of voice data exists ("Yes" in S27), the program returns to S20 where the same processes as described above are performed. If not ("No" in S27), the reproduction process is ended.

It is noted that when the user desires to erase data stored in the memory 40 after the data is reproduced as described above, the user may depress an erase button (not shown in the drawing) provided on the operation panel 42, whereupon data is all erased from the memory 40 and also from the table 33b.

As described above, according to the present embodiment, the received image data and voice data are both stored in the voice/image memory 40 of the reception control device 29. When both image data and voice data are received at a single reception operation, the voice/image matching table 33b is recorded with data on an area in the memory 40 where the image data is stored, in correspondence with data on an area in the memory 40 where the corresponding voice data is stored. In more concrete terms, data of lead and end addresses of the area where the image data is stored is recorded in correspondence with data of an address of the area where the corresponding voice data is stored. After the voice data is reproduced at the speaker 47, the corresponding image data is outputted at the printer 11.

While the invention has been described in detail with reference to specific embodiment thereof, it would be apparent to those skilled in the art that various changes and modifications may be made therein without departing from the spirit of the invention.

For example, image data and/or voice data may be automatically erased from the memory 40 after the image data is outputted in S26.

In the above-described embodiment, when voice data and image data are transmitted in this order at a single transmission operation, the present facsimile machine stores both data. However, the present facsimile machine can be constructed to receive both data even when image data is first transmitted and then voice data is transmitted within the single transmission operation.

Figure 7:
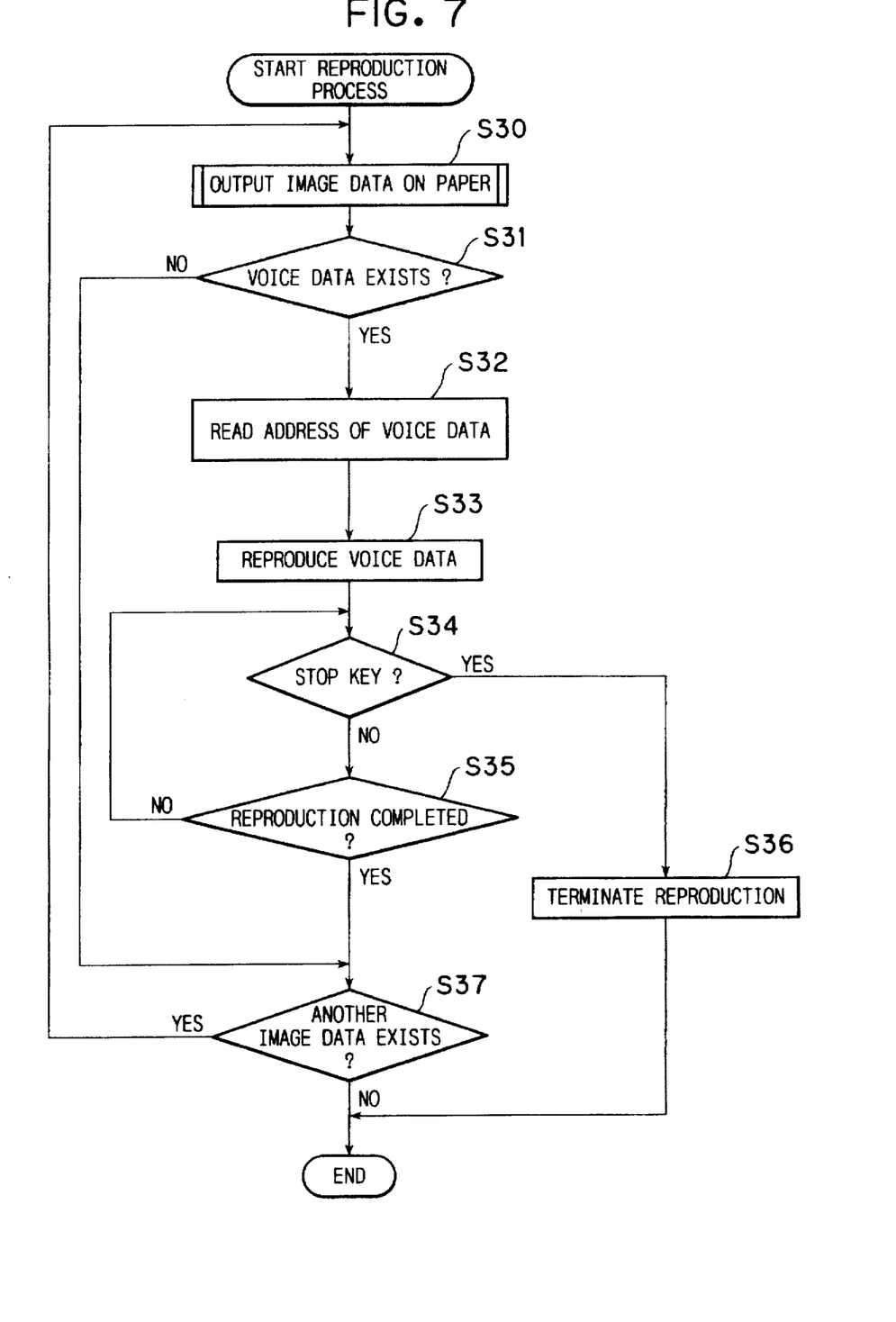
FIG. 7 is a flowchart showing a modification of the reproduction process performed by the facsimile machine of FIG. 1.

In the above-described embodiment, when image data and voice data are both received at a single reception operation, the voice data and the image data are reproduced in this order as shown in FIG. 6 regardless of whether the voice data is received earlier than the image data. However, the voice data and the image data may be reproduced as shown in FIG. 7 so that the image data is first reproduced and then the voice data is reproduced thereafter. In the reproduction process of FIG. 7, image data is first outputted in S30. Then, the matching table 33b is searched and it is judged in S31 whether or not voice data is stored in the memory 40 in correspondence with the image data. If voice data exists, the index address of the voice data is read out in S32, and the voice data is retrieved and reproduced in S33. When the reproduction is completed ("Yes" in S35) and when another image data is stored in the memory 40 ("Yes" in S37), the other image data will be outputted in S30.

In this case, the user can first view a record sheet printed with the image data. The user can therefore more easily know from whom the image data is transmitted. Accordingly, the user can more easily know the correspondence between the image data and the voice data. The voice data may be reproduced immediately after the corresponding image data is reproduced. Alternatively, the voice data may be reproduced when a certain period of time passes after the corresponding image data is reproduced.

Similarly, when the voice data is reproduced earlier than the image data, the image data may be reproduced immediately after the corresponding voice data is reproduced. Alternatively, the image data may be reproduced when a certain period of time passes after the corresponding voice data is reproduced.

It is further noted that the voice data and the image data may be reproduced in an order that the voice data and the image data are received at the reception operation.

In the embodiment, image data and voice data are stored in a single memory 40. However, image data and voice data may be stored in different memories.

In the embodiment, when image data and voice data are received at the present facsimile machine 1 in a single reception operation, they will be reproduced at that facsimile machine 1. However, the image data and the voice data may be reproduced at other various types of machines. That is, the pair of digital data, constructed from the image data and the voice data, may be transferred to another facsimile machine, or a personal computer provided with a modem, where they are reproduced.

As described above, the facsimile machine of the present invention is provided with an answering machine function. The facsimile machine is provided with a reception control device for performing a reception operation to receive voice data and image data transmitted via a telephone line. The voice data represents voices, and image data represents images. The received voice data and the received image data are both stored. The thus stored voice data and the image data will be reproduced afterwardly. According to the present invention, when voice data and image data are both received during a single reception operation and stored according to the answering machine function, the voice data and the image data are stored in correspondence with each other. Accordingly, when the voice data and the image data are reproduced afterward, the user of the facsimile machine can easily know correspondence between the reproduced image and voice.

The voice data and the image data stored in a memory in correspondence with each other are successively reproduced. Accordingly, when both the voice data and the image data are received during a single reception operation, both sets of data will be reproduced immediately one after the other. The user can therefore easily perceive correspondence between the reproduced image and voice.

In the memory, image data is stored at an area indicated by a start address and an end address. Voice data is stored at another area indicated by a single address. Another memory is provided for storing data of the start and end addresses where the image data is stored and for storing data of the address where the voice data is stored. The start and end addresses for the image data and the address for the voice data are stored next to each other when the image data and the voice data are received at the single reception operation.

Because addresses of storage, where image data and corresponding voice data are stored, are recorded in the other memory, it is easily possible to find out the corresponding voice data and image data. The reproduction operation can be quickly performed.

The corresponding voice data and image data can be successively reproduced so that the image data is reproduced first regardless of the order in which the voice data and the image data are received. Accordingly, the user of the facsimile machine can first receive the image, and therefore can easily know from whom the image has been transmitted. The user can therefore easily perceive correspondence between the image and the voice reproduced thereafter.

What is claimed is:

1. A facsimile machine capable of receiving both image data and voice data transmitted via a telephone line, the facsimile machine comprising:

data reception means capable of performing a reception operation to receive at least one of voice data and image data transmitted via a telephone line, voice data representing voices and image data representing image;

data storage means for storing the received at least one of voice data and image data, the data storage means storing the received voice data and image data in correspondence with each other when the voice data and the image data are both transmitted during a single reception operation;

data output means for outputting the at least one of the voice data and the image data stored in the data storage means, the data output means including reproducing means for respectively reproducing the voice data and the image data stored in the data storage means; and reproduction control means for controlling, when voice data and image data are both transmitted during a single reception operation and are stored in the data storage means in correspondence with each other, the reproducing means to successively reproduce the voice data and the image data, the reproduction control means controlling the reproducing means to first reproduce either one of the voice data and the image data.

2. A facsimile machine as claimed in claim 1, further comprising storage control means for controlling, when voice data and image data are both transmitted during a single reception operation, the data storage means to store the voice data and image data in correspondence with each other.

3. A facsimile machine as claimed in claim 2, wherein the data storage means includes:

data memory means for storing image data at an area indicated by a start address and an end address and for storing voice data at another area indicated by a single address;

area memory means for storing data of the start and end addresses where the image data is stored and for storing data of the address where the voice data is stored, and wherein the storage control means controls the area memory means to store the data of the start and end addresses for the image data and the data of the address for the voice data next to each other when the image data and the voice data are received during the single reception operation.

4. A facsimile machine as claimed in claim 1, wherein the reproduction control means controls the reproducing means to successively reproduce the voice data and the image data in this order regardless of an order in which the voice data and the image data are received.

5. A facsimile machine as claimed in claim 1, wherein the reproduction control means controls the reproducing means to successively reproduce the image data and the voice data in this order regardless of an order in which the voice data and the image data are received.

6. A facsimile machine as claimed in claim 1, wherein the reproduction control means controls the reproducing means to successively reproduce the image data and the voice data in an order in which the voice data and the image data are received.

7. A facsimile machine as claimed in claim 1, wherein the reproducing means includes:

voice reproducing means for reproducing voices from the voice data; and image reproducing means for reproducing images from the image data.

8. A facsimile machine as claimed in claim 7, wherein the reproduction control means successively actuates the voice reproducing means and the image reproducing means to successively reproduce voice data and image data which are stored in the data storage means in correspondence with each other, the reproduction control means actuating the voice reproducing means and the image reproducing means so that either one of the voice reproducing means and the image reproducing means is actuated first.

9. A facsimile machine as claimed in claim 8, wherein the reproduction control means successively actuates the voice reproducing means and the image reproducing means so that the image reproducing means is actuated first.

10. A facsimile machine provided with an answering function, the facsimile machine comprising:

data reception means for performing a reception operation to receive voice data and image data transmitted via a telephone line, voice data representing voices and image data representing images;

data storage means for storing the voice data and the image data;

storage control means for controlling, when voice data and image data are both transmitted during a single reception operation, the data storage means to store the voice data and image data in correspondence with each other;

voice reproducing means for reproducing voices from the voice data stored in the data storage means;

image reproducing means for reproducing images from the image data stored in the data storage means; and reproduction control means for successively actuating the voice reproducing means and the image reproducing means to successively reproduce voice data and image data which are stored in the data storage means in correspondence with each other, the reproduction control means actuating the voice reproducing means and the image reproducing means so that either one of the voice reproducing means and the image reproducing means is actuated first.

11. A facsimile machine as claimed in claim 10, wherein the data storage means includes:

data memory means for storing image data at an area indicated by a start address and an end address and for storing voice data at another area indicated by a single address;

area memory means for storing data of the start and end addresses where the image data is stored and for storing data of the address where the voice data is stored, and wherein the storage control means control the area memory means to store the data of the start and end addresses for the image data and the data of the address for the voice data next to each other when the image data and the voice data are received during the single reception operation.

12. A facsimile machine as claimed in claim 10, wherein the reproduction control means successively actuates the voice reproducing means and the image reproducing means so that the image reproducing means is actuated first regardless of an order in which the corresponding voice data and image data have been received.

13. A data reception control device provided in a facsimile machine having an answering function, the device comprising:

a data reception unit that performs a reception operation to receive voice data and image data transmitted via a telephone line, voice data representing voices and image data representing images;

a data storage unit that stores the voice data and the image data;

a storage control unit that controls, when voice data and image data are both transmitted during a single reception operation, the data storage unit to store the voice data and image data in correspondence with each other;

a voice reproducing unit that reproduces voices from the voice data stored in the data storage unit;

an image reproducing unit that reproduces images from the image data stored in the data storage unit; and a reproduction control unit that successively actuates the voice reproducing unit and the image reproducing unit to successively reproduce voice data and image data which are stored in the data storage unit in correspondence with each other, the reproduction control unit actuating the voice reproducing unit and the image reproducing unit so that either one of the voice reproducing unit and the image reproducing unit is actuated first.

14. A data reception control device as claimed in claim 13, wherein the data storage unit includes:

a data memory unit that stores image data at an area indicated by a start address and an end address and that stores voice data at another area indicated by a single address;

an area memory unit that stores data of the start and end addresses where the image data is stored and that stores data of the address where the voice data is stored, and wherein the storage control unit controls the area memory unit to store the data of the start and end addresses for the image data and the data of the address for the voice data next to each other when the image data and the voice data are received during the single reception operation.

15. A data reception control device as claimed in claim 13, wherein the reproduction control unit successively actuates the voice reproducing unit and the image reproducing unit so that the image reproducing unit is actuated first regardless of an order in which the corresponding voice data and image data have been received.

* * * * *